United States Patent [19]

Bonten et al.

[11] Patent Number: 4,525,505

[45] Date of Patent: Jun. 25, 1985

[54] FIRE-RESISTANT POLYAMIDE MOULDING COMPOSITIONS

[75] Inventors: Heinz Bonten; Werner Nielinger; Dietrich Michael; Heinrich Haupt, all of Krefeld, Fed. Rep. of Germany

[73] Assignee: Bayer Aktiengesellschaft, Fed. Rep. of Germany

[21] Appl. No.: 561,302

[22] Filed: Dec. 14, 1983

[30] Foreign Application Priority Data

Dec. 28, 1982 [DE] Fed. Rep. of Germany ....... 3248330

[51] Int. Cl.³ ................................................ C08K 5/34
[52] U.S. Cl. ..................................... 524/100; 524/538; 524/542; 525/405; 525/406; 525/414; 525/427
[58] Field of Search ...................... 524/100, 538, 542; 525/423, 427, 430, 405, 406, 414

[56] References Cited

U.S. PATENT DOCUMENTS 3,475,898  4/1967  Magat et al. ......................... 525/430
3,660,344  5/1972  Michael et al. ...................... 524/100
4,342,680  8/1982  Sugio et al. ......................... 524/100

FOREIGN PATENT DOCUMENTS 2004073  11/1969  France .

OTHER PUBLICATIONS

Hawley, G. Condensed Chemical Dictionary Van Nostrand Reinhold Company, 1977, p. 70.
Chemical Abstracts, 85: 124942h (1976).
Chemical Abstracts, 84: 60701y (1976).

*Primary Examiner*—Morton Foelak
*Assistant Examiner*—Kriellion Morgan
*Attorney, Agent, or Firm*—Connolly and Hutz

[57] ABSTRACT

This invention relates to flame-proved polyamide moulding compositions containing a combination of from 10 to 18%, by weight melamine and from 1 to 7% by weight of a thermoplastic polyacetal, in each case based on the moulding composition.

8 Claims, No Drawings

FIRE-RESISTANT POLYAMIDE MOULDING COMPOSITIONS

This invention relates to flame-proved polyamides which contain a combination of melamine and polyacetals as flame proving agents.

Polyamides which are flame proved without halogen containing compounds and which also allow a light colour adjustment are recently becoming increasingly important for the production of injection moulded articles for the electric sector. Melamine in particular has proved to be an effective fireproofing agent in optionally reinforced polyamides (JA-PS No. 47-1714 and DE-PS No. 1,803,606). However, a disadvantage of polyamides rendered fireresistant in this way is that melamine migrates to the surface of the mouldings, particularly in an atmosphere having a high moisture content, and may there form unsightly coatings. In the case of injection moulded parts used for the electric sector, this may result in a soiling of the contacts. Therefore, there have been made numerous attempts to eliminate the migration of melamine, for example by using the melamine as a salt of an inorganic acid or as a reaction product with triazolidone-3,5-diones or barbituric acid derivatives and formaldehyde. However, polyamides which contain these flameproofing agents may only be compounded and processed at relatively low temperatures, on account of the low thermal stability of the compounds. For this reason, it is not always possible to produce perfect thinwalled mouldings of a complicated design.

Surprisingly, it has now been found that it is possible to reduce considerably the melamine migration without substantially impairing the processing behaviour and the flame resistance by adding polyacetals to the melamine containing polyamides.

Therefore, the present invention relates to polyamide moulding compositions which contain from 10 to 18%, preferably from 12 to 16%, by weight, based on the total moulding composition, of melamine and from 1 to 7%, preferably from 3 to 5%, by weight, based on the total moulding composition, of at least one thermoplastic polyacetal.

Moulding compositions containing polyacetal may be easily processed, into thin-walled and complicated mouldings, preferably by injection moulding. The migration of the melamine is substantially suppressed by the addition of the polyacetal. The bloom phenomena are clearly reduced in comparison to melamine used on its own.

Polyamides which are suitable for the production of the moulding composition according to the present invention are those which may be produced by known polycondensation processes, starting from diamines and dicarboxylic acids and/or lactams having at least 5 ring members or corresponding ω-amino acids. The following are included as starting materials: aliphatic and aromatic dicarboxylic acids, such as adipic acid, 2,2,4- and 2,4,4-trimethyladipic acid, azelaic acid, sebacic acid, decane dicarboxylic acid, dodecane dicarboxylic acid, isophthalic acid and terephthalic acid, aliphatic and aromatic diamines, such as hexamethylene diamine, 2,2,4- and 2,4,4-trimethylhexamethylene diamine, the isomeric diamino-dicyclohexyl-methanes, diamino-dicyclohexylpropanes, isophorone diamine, the isomeric xylylenediamines and bis-aminomethyl-cyclohexane, amino carboxylic acids, such as ε-aminocaproic acid, Ω-aminoundecanoic acid and ω-aminolauric acid, or the corresponding lactams. Of course, copolyamides of several of the above-mentioned monomers are to be included and mixtures of the polyamides mentioned above.

Polyamide-6 and polyamide-6,6 are preferred polyamides. In particular polyamide-6,6, is preferably used.

Compounds of the type described in Kirk-Othmer, Encyclopedia of Chemical Technology, Second Edition Vol. 1, 95–105, Wiley and Sons Inc., New York, 1963 are preferably used as thermoplastic polyacetals. These include the following, in particular: polyformaldehyde and copolymers of formaldehyde with from 0.1 to 20%, preferably from 0.5 to 10%, by weight, based on the copolymer, one or more of other copolymerisable compounds, preferably cyclic ethers, having from 2 to 20 carbon atoms in the ring, for example epoxides, preferably ethylene oxide and/or epichlorohydrin, or cyclic formals having at least 2 oxygen atoms and at least $C_2$–$C_5$ in the ring, for example 1,3-dioxolane or 5-phenyl-1,3-dioxolane. The thermoplastic polyacetals should preferably have melt indices of from 1 to 30 determined according to DIN 53735 (g/10 min.).

The polyamide moulding compositions according to the present invention are preferably produced by mixing the melamine and the polyacetal with the polyamide in conventional single- or double-shaft extruders in the polyamide melt. The components may be also mixed before extrusion or they may be added into the molten polyamide.

It is also possible to use batches of the additives in polyamide or to mix melamine-containing polyamide with the polyacetal and to process this mixture in a conventional injection moulding machine.

Furthermore, it is also possible to mix the two components of the flameproofing combination, optionally molten before they are incorporated.

The flame-proved polyamide moulding compositions may also contain the conventional additives, fillers and/or reinforcing agents, for example mould-release agents, flowing agents, stabilizers, dyes, pigments, silicates, chalk, quartz, glass fibres and glass balls, in known quantities.

The fillers and/or reinforcing materials are used in quantities of 10–60% preferably 20–40% by weight, based on the moulding composition.

The polyamides are especially suitable for the production of mouldings which are used in the electric sector and of which a good surface is desired, such as visible housings or coverings.

EXAMPLE 1 TO 7

Polyamide 66 (relative viscosity 3.0, measured using a 1% solution in m-cresol at 25° C.) is mixed with melamine and various polyacetals (Hostaforme ® of Hoechst AG) is a double shaft extruder of the ZSK 32-type manufactured by Werner and Pfleiderer, at a temperature of from 274° to 280° C. and with a throughput of 20 kg/h. The mixture is cooled in a water bath as a bristle. After granulation and drying, the mixture is processed into test bodies.

The following Table 1 gives the composition of the mixture, the melt indices of the polyacetals which were used and the results of the tests. Experiment 8 is a comparative Experiment without the addition of polyacetal.

In the combustibility test according to Underwriters Laboratories Subj. 94, the products having a thickness of 1/8" and 1/16" are VO.

TABLE 1

| Experiment | | | 1 | 2 | 3 | 4 | 5 | 6 | 7 | 8* |
|---|---|---|---|---|---|---|---|---|---|---|
| | MFI 190/2,16 | | | | | | | | | |
| Polyamide 66 | | %, by weight | 83 | 82 | 81 | 83 | 82 | 83 | 82 | 86 |
| Melamine | | %, by weight | 14 | 14 | 14 | 14 | 14 | 14 | 14 | 14 |
| Polyacetal | 9 | %, by weight | 3 | 4 | 5 | | | | | — |
| Polyacetal | 27 | %, by weight | | | | 3 | 4 | | | — |
| Polyacetal | 1 | %, by weight | | | | | | 3 | 4 | |
| Impact strength | DIN 53 453 kJ/m$^2$ | | 29.6 | 33.3 | 30.5 | 31.6 | 37.6 | 34.0 | 34.8 | 32.2 |
| Notched impact strength | DIN 53 453 kJ/m$^2$ | | 2.8 | 3.2 | 3.3 | 3.1 | 3.5 | 3.1 | 3.0 | 2.7 |
| Limiting bending stress | DIN 53 452 MPa | | 123 | 120 | 119 | 125 | 120 | 126 | 124 | 127 |
| Melamine migration after hours | | | 18 | 22 | 24 | 22 | 26 | 18 | 20 | 6 |
| Behavior in fire according to | | | | | | | | | | |
| UL Subj. 94 1/16" | | | VO | VO | VO | VO | VO | VO | VO | VO |
| ⅛" | | | VO | VO | VO | VO | VO | VO | VO | VO |

*Comparative Example

In order to assess the migration of the melamine, the mouldings are stored at 40° C. in an atmosphere saturated with water vapour (tropial climate) and the time when the first bloom of the melamine occurs is stated in Table 1.

EXAMPLES 9 TO 13

Polyamide 66, melamine and the quantities, stated in the Table, of polyacetal having a melt index of 9 (Hostaform C 9021 ®) were mixed in the quantity ratios stated in Table 2 in a double shaft extruder of the ZSK 53-type manufactured by Werner and Pfleiderer. The mass temperature was 275° C. and the throughput was 50 kg/h.

TABLE 2

| Example | Polyamide 66 % | Melamine % | Polyacetal % | UL test ¼" | ⅛" | 1/16" | Migration h |
|---|---|---|---|---|---|---|---|
| 12 | 86 | 14 | — | V0 | V0 | V0 | 6 |
| 13 | 83 | 14 | 3 | V0 | V0 | V0 | 16 |
| 14 | 82 | 14 | 4 | V0 | V0 | V0 | 22 |
| 15 | 81 | 14 | 5 | V0 | V0 | V0 | 24 |
| 16* | 76 | 14 | 10 | V2 | V2 | V2 | 60 |

We claim:

1. A polyamide moulding composition containing from 10 to 18%, by weight, of melamine and from 1 to 7%, by weight of a thermoplastic polyacetal.

2. A composition as claimed in claim 1 containing 12 to 16%, by weight of melamine and from 3 to 5%, by weight of a thermoplastic polyacetal.

3. A composition as claimed in claim 1, wherein the polyacetal is a polyformaldehyde or a copolymer of formaldehyde and a cyclic ether or cyclic formal.

4. A composition as claimed in claim 3, wherein the copolymer is a copolymer of formaldehyde and ethylene oxide and/or epichlorohydrin or a copolymer of formaldehyde and 1,3-dioxolane or 5-phenyl-1,3-dioxolane.

5. A composition as claimed in claim 1, wherein the polyamide is polyamide-6 or polyamide 6,6.

6. A composition as claimed in claim 1 containing 10–60% by weight of filler and/or reinforcing material.

7. Moulded articles obtained of compositions as claimed in claim 1.

8. A composition as claimed in claim 1, wherein the composition is a filled or reinforced polyamide.

* * * * *